United States Patent
Andou et al.

(10) Patent No.: US 12,214,631 B2
(45) Date of Patent: Feb. 4, 2025

(54) VEHICLE STATE GRASPING SYSTEM

(71) Applicant: TOYOTA JIDOSHA KABUSHIKI KAISHA, Aichi-ken (JP)

(72) Inventors: Tsuyoshi Andou, Toyota (JP); Takahiro Kamogawa, Nagoya (JP); Yosuke Kimura, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 49 days.

(21) Appl. No.: 18/324,153

(22) Filed: May 26, 2023

(65) Prior Publication Data
US 2024/0034108 A1     Feb. 1, 2024

(30) Foreign Application Priority Data
Jul. 28, 2022 (JP) ................. 2022-120836

(51) Int. Cl.
  *B60C 23/04*    (2006.01)
  *G07C 5/00*    (2006.01)

(52) U.S. Cl.
  CPC .......... *B60C 23/0479* (2013.01); *G07C 5/008* (2013.01)

(58) Field of Classification Search
  CPC .................. B60C 23/0479; G07C 5/008
  See application file for complete search history.

(56) References Cited

U.S. PATENT DOCUMENTS

| | | | | |
|---|---|---|---|---|
| 9,487,054 | B2* | 11/2016 | McIntyre | B60C 23/0471 |
| 10,703,147 | B2* | 7/2020 | Araki | B60C 23/0435 |
| 2014/0266661 | A1* | 9/2014 | Deniau | B60C 23/0471 |
| | | | | 340/445 |
| 2015/0239307 | A1* | 8/2015 | Horikoshi | B60C 23/0477 |
| | | | | 340/442 |
| 2017/0010122 | A1* | 1/2017 | Abe | G08G 1/096775 |
| 2020/0031180 | A1* | 1/2020 | Usami | B60C 23/0401 |
| 2023/0311591 | A1* | 10/2023 | Teramoto | B60S 5/04 |
| | | | | 73/146 |

FOREIGN PATENT DOCUMENTS

JP    2002-132994 A    5/2002

* cited by examiner

*Primary Examiner* — Mohamed Barakat
(74) *Attorney, Agent, or Firm* — HAUPTMAN HAM, LLP

(57) ABSTRACT

After the air pressure of the tire of the vehicle has decreased to a predetermined abnormal value, the system management server determines that the vehicle has returned to a normal value without performing a tire replacement operation or a tire repair operation (for example, there is a driver that continuously drives the vehicle by replenishing air without performing a tire replacement even if the tire is punctured), and transmits abnormality notification information to the administrator terminal device. Thus, the warning information is provided to the current driver of the vehicle by the operation of the administrator terminal device by the administrator.

4 Claims, 7 Drawing Sheets

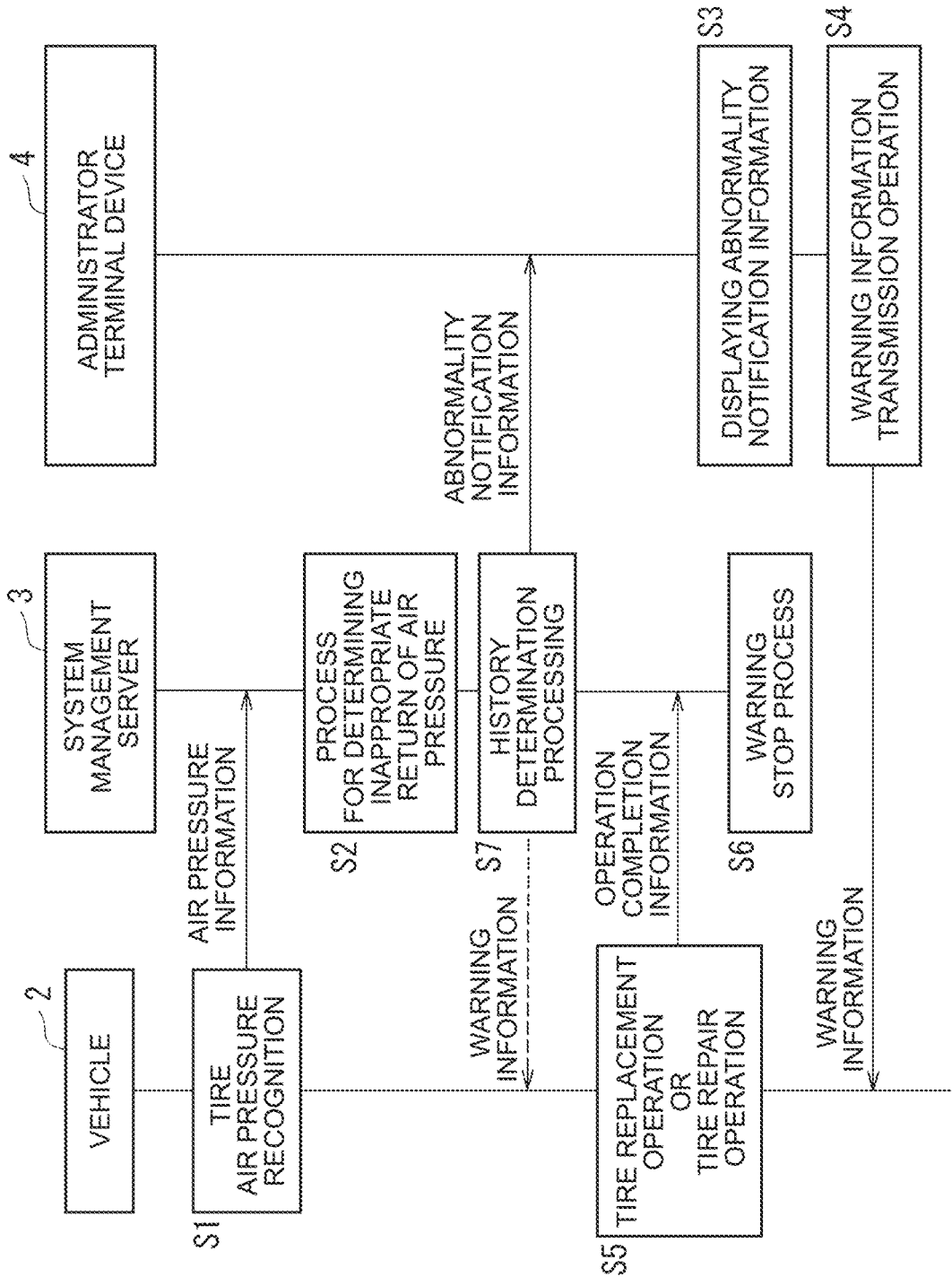

VEHICLE STATE GRASPING SYSTEM

CROSS-REFERENCE TO RELATED APPLICATION

This application claims priority to Japanese Patent Application No. 2022-120836 filed on Jul. 28, 2022, incorporated herein by reference in its entirety.

BACKGROUND

1. Technical Field

The present disclosure relates to a vehicle state grasping system. In particular, the present disclosure relates to an improvement in a response to a situation in which an air pressure of a tire of a vehicle drops to a predetermined abnormal value in a vehicle state grasping system in which a plurality of drivers shares a vehicle under an administrator.

2. Description of Related Art

In the related art, a system disclosed in Japanese Unexamined Patent Application Publication No. 2002-132994 (JP 2002-132994 A) is known as a system for grasping a state of a vehicle. JP 2002-132994 A discloses that a tire management server is provided, and when the tire management server receives data indicating a state of a tire from a vehicle terminal and determines that there is an urgent need for coping with the tire (for example, repair of the tire), the tire management server notifies the state of the tire to the corresponding vehicle terminal. More specifically, all of the tires are equipped with transponders, and the tire air pressure data is externally transmitted to the tire management server together with the tire IDs at predetermined time intervals.

SUMMARY

However, in a case where a plurality of drivers shares a vehicle under an administrator (for example, in a case where a plurality of drivers alternately uses the same taxi vehicle under the control of a taxi company), there may be a driver who continues to drive the vehicle while replenishing air (replenishing air at a service station or the like) without performing tire replacement (tire replacement operation) (while avoiding troublesome tire replacement operation) even when the tire is punctured (to the extent that air is gradually exhausted).

In this case, the next driver who uses the vehicle is forced to perform a tire replacement operation or a puncture repair operation, which increases a burden on the next driver. In addition, there is also an issue that the driver is dissatisfied with that the driver is forced to perform the tire replacement operation or the puncture repair operation despite the fact that the driver is not responsible for puncture of the tire (for example, even though the tire has already been punctured at the time when the driver is on board (in the case of a taxi, at the time of starting inspection)).

In JP 2002-132994 A, there is no technical idea for solving such problems, there is room for improvement in this respect. That is, the technique in JP 2002-132994 A is to notify the driver of occurrence of the tire puncture when the tire is determined to be punctured based on the information provided from the transponder, and therefore, when an act of replenishing the air without performing the tire replacement as described above is performed, the notification is canceled, whereby it is not possible to obtain a deterrent force against this act. The reason why the air pressure of the tire drops to an abnormal value is not limited to a case where the tire is punctured, but may be a case where the air valve of the tire is damaged.

An object of the present disclosure is to provide a vehicle state grasping system and a vehicle state grasping method capable of prompting a driver who is currently driving a vehicle to take measures such as tire replacement when a situation occurs in which the air pressure of a tire of the vehicle drops to a predetermined abnormal value in the vehicle state grasping system in which a plurality of drivers shares the vehicle under an administrator.

The solution of the present disclosure for achieving the above object premises a vehicle state grasping system that is able to grasp a state of a vehicle in a vehicle usage mode in which a plurality of drivers shares the vehicle under an administrator. Then, the vehicle state grasping system includes: an air pressure recognition unit that recognizes an air pressure of a tire of the vehicle; an air pressure information transmitting unit that transmits information on the air pressure of the tire recognized by the air pressure recognition unit; and a system management server that receives the information on the air pressure of the tire transmitted by the air pressure information transmitting unit. Further, the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire, and the system management server includes an abnormality notification information transmitting unit that transmits the abnormality notification information to a communication device operated by the administrator when the abnormality notification information is received from the abnormality notification information generating unit.
The communication device is configured to be able to provide warning information to at least one of a user interface device mounted on the vehicle and a terminal carried by a current driver of the vehicle by an operation of the administrator.

According to this specific matter, as the information on the air pressure of the tire received by the system management server from the air pressure information transmitting unit, when the normal value of the air pressure of the tire is recovered without performing any of the tire replacement operation and the tire repair operation after the air pressure of the tire drops to the predetermined abnormal value, the abnormality notification information generating unit generates the abnormality notification information, and the abnormality notification information transmitting unit transmits the abnormality notification information to the communication device operated by the administrator. With the above, the administrator recognizes that the current driver of the vehicle recovers the normal value of the air pressure of the tire without performing any of the tire replacement operation and the tire repair operation even though the air pressure of the tire drops to the predetermined abnormal value. Then, the administrator operates the communication device to provide at least one of the user interface device mounted on the vehicle and the terminal carried by the current driver of the vehicle with the warning information. That is, the current driver of the vehicle is warned that the tire replacement operation or the tire repair operation needs to be performed. When the driver who receives the warning information performs the tire replacement operation or the tire repair operation, the next driver who uses the vehicle is not forced to perform the tire replacement operation or the tire repair operation any more, and the burden on the next driver (the driver that uses the vehicle after the tire replacement operation or the tire repair operation is performed) can be eliminated.

Further, another solution of the present disclosure for achieving the above object premises a vehicle state grasping system that is able to grasp a state of a vehicle in a vehicle usage mode in which a plurality of drivers shares the vehicle under an administrator. Then, the vehicle state grasping system includes: an air pressure recognition unit that recognizes an air pressure of a tire of the vehicle; an air pressure information transmitting unit that transmits information on the air pressure of the tire recognized by the air pressure recognition unit; and a system management server that receives the information on the air pressure of the tire transmitted by the air pressure information transmitting unit. Further, the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire, and the system management server includes a warning information transmitting unit that transmits warning information to at least one of a user interface device mounted on the vehicle and a terminal carried by a current driver of the vehicle when the abnormality notification information is received from the abnormality notification information generating unit.

In the case of this specific matter, as the information on the air pressure of the tire received by the system management server from the air pressure information transmitting unit, when the normal value of the air pressure of the tire is recovered without performing any of the tire replacement operation and the tire repair operation after the air pressure of the tire drops to the predetermined abnormal value, the abnormality notification information generating unit generates the abnormality notification information, and the warning information transmitting unit that receives the abnormality notification information transmits the warning information to at least one of the user interface device mounted on the vehicle or the terminal carried by the current driver of the vehicle. That is, in this case, the system management server automatically performs the operation to warn the current driver of the vehicle that the tire replacement operation or the tire repair operation needs to be performed. When the driver who receives the warning information performs the tire replacement operation or the tire repair operation, the next driver who uses the vehicle is not forced to perform the tire replacement operation or the tire repair operation any more, and the burden on the next driver can be eliminated.

Furthermore, still another solution of the present disclosure for achieving the above object premises a vehicle state grasping system that is able to grasp a state of a vehicle in a vehicle usage mode in which a plurality of drivers shares the vehicle under an administrator.

Then, the vehicle state grasping system includes: an air pressure recognition unit that recognizes an air pressure of a tire of the vehicle; an air pressure information transmitting unit that transmits information on the air pressure of the tire recognized by the air pressure recognition unit; and a system management server that receives the information on the air pressure of the tire transmitted by the air pressure information transmitting unit.

Further, the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire, the system management server includes an abnormality notification information transmitting unit that transmits the abnormality notification information to a communication device operated by the administrator on condition that the abnormality notification information is received, and the system management server includes a warning information transmitting unit that transmits warning information to at least one of a user interface device mounted on the vehicle and a terminal carried by a current driver of the vehicle on condition that the abnormality notification information is received.

Further, the vehicle state grasping system includes a transmission destination switching unit that is able to switch between a first transmission mode to transmit the abnormality notification information to the abnormality notification information transmitting unit and a second transmission mode to transmit the abnormality notification information to the warning information transmitting unit, and the vehicle state grasping system includes a history information storage unit that stores driving history information of each of the drivers. Then, when the normal value of the air pressure of the tire is recovered without performing any of the tire replacement operation and the tire repair operation after the air pressure of the tire drops to the predetermined abnormal value, the transmission destination switching unit switches to the first transmission mode when the driver is a driver with a past history of recovering the normal value of the air pressure of the tire without performing any of the tire replacement operation and the tire repair operation after the air pressure of the tire drops to the predetermined abnormal value, and switches to the second transmission mode when the driver is any other driver than the driver with the history, with reference to the driving history information of each of the drivers stored in the history information storage unit.

The driver who has a history of recovering the normal value of the air pressure of the tire without performing any of the tire replacement operation and the tire repair operation even though the air pressure of the tire drops to the predetermined abnormal value is highly likely to perform the same act again. In view of this point, in the present solution, when a situation occurs in which a normal value of the air pressure of the tire is recovered without performing any of the tire replacement operation and the tire repair operation after the air pressure of the tire drops to the predetermined abnormal value, and the driver of the vehicle is a driver who has performed the same act also in the past, the mode in which the administrator transmits the warning information (the first transmission mode to transmit the abnormality notification information to the communication device operated by the administrator by transmitting the abnormality notification information to the abnormality notification information transmitting unit) is established, instead of the mode in which the system management server transmits the warning information (the second transmission mode to transmit the warning information to at least one of the user interface device mounted on the vehicle and the terminal carried by the current driver of the vehicle by transmitting the abnormality notification information to the warning information transmitting unit). With the above, the administrator can issue a human-induced warning (advice) to the current driver of the vehicle. Therefore, it is possible to further compel the driver to perform the tire replacement operation or the tire repair operation.

Further, the system management server raises a warning level of the warning information transmitted from the warning information transmitting unit when the normal value of the air pressure of the tire is recovered without performing any of the tire replacement operation and the tire repair operation in the same vehicle again after the air pressure of the tire drops to the predetermined abnormal value, after the warning information is transmitted to at least one of the user interface device mounted on the vehicle and the terminal carried by the current driver of the vehicle from the warning information transmitting unit.

When the same driver performs an act of recovering the normal value without performing any of the tire replacement operation and the tire repair operation again after the air pressure of the tire drops to the predetermined abnormal value, this raises the warning level of the warning information so as to prohibit the driver from performing the same act. With the above, it is possible to enhance the deterrent force against the repetition of such an act.

Further, in the vehicle state grasping system, when a plurality of the vehicles is managed under the administrator, the information on the air pressure of the tire transmitted from the air pressure information transmitting unit to the system management server is associated with individual information assigned to each of the vehicles.

According to this configuration, in a situation where the vehicles are managed, it is possible to specify which of the vehicles has been subjected to the aforementioned act (an act of recovering the normal value without performing any of the tire replacement operation and the tire repair operation after the air pressure of the tire drops to the predetermined abnormal value). Therefore, it is possible to accurately identify the vehicle or driver to which the warning information is transmitted, and it is possible to appropriately transmit the warning information only to the corresponding vehicle or driver.

Further, a vehicle state grasping method implemented in the above-described vehicle state grasping system is also within the scope of the technical idea of the present disclosure.

That is, a vehicle state grasping method that is able to grasp a state of a vehicle in a vehicle usage mode in which a plurality of drivers shares the vehicle under an administrator is premised.

The vehicle state grasping method includes the following operations: an air pressure recognition operation of recognizing an air pressure of a tire of the vehicle; an operation of generating abnormality notification information when a normal value of the air pressure of the tire is recovered without performing any of a tire replacement operation and a tire repair operation after the air pressure of the tire drops to a predetermined abnormal value, based on information of the recognized air pressure of the tire; and an operation of providing warning information to at least one of a user interface device mounted on the vehicle and a terminal carried by a current driver of the vehicle, accompanied by that the abnormality notification information is generated.

According to the vehicle state grasping method as well, similar to the vehicle state grasping system, the current driver of the vehicle can be warned that the tire replacement operation or the tire repair operation needs to be performed.

When the driver who receives the warning information performs the tire replacement operation or the tire repair operation, the next driver who uses the vehicle is not forced to perform the tire replacement operation or the tire repair operation any more, and the burden on the next driver can be eliminated.

According to the present disclosure, the warning information can be provided to the current driver of the vehicle when the normal value of the air pressure of the tire is recovered without performing the tire replacement operation or the tire repair operation after the air pressure of the tire drops to the predetermined abnormal value (for example, when there is a driver who continuously drives the vehicle by replenishing air without performing the tire replacement even though the tire is punctured). Accordingly, when the driver who receives the warning information performs the tire replacement operation or the tire repair operation, the next driver who uses the vehicle is not forced to perform the tire replacement operation or the tire repair operation any more, and the burden on the next driver can be eliminated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a sequence diagram illustrating an example of operations of the vehicle, the system management server, and the administrator terminal device according to the third embodiment.

DETAILED DESCRIPTION OF EMBODIMENTS

Hereinafter, a plurality of embodiments of the present disclosure will be described with reference to the drawings. In the following embodiments, a case will be described in which the vehicle state grasping system according to the present disclosure is applied as a system that performs some functions of a vehicle management system (a system that manages operation of a plurality of taxi vehicles) in a taxi company as an example. In other words, in each of the embodiments, the "vehicle usage mode in which a plurality of drivers share a vehicle under the control of an administrator" in the present disclosure corresponds to a vehicle usage mode in which a plurality of (for example, two) drivers take over a plurality of taxi vehicles under the control of an operation administrator of a taxi company (for example, take over at day and night).

First Embodiment

Figure 1:
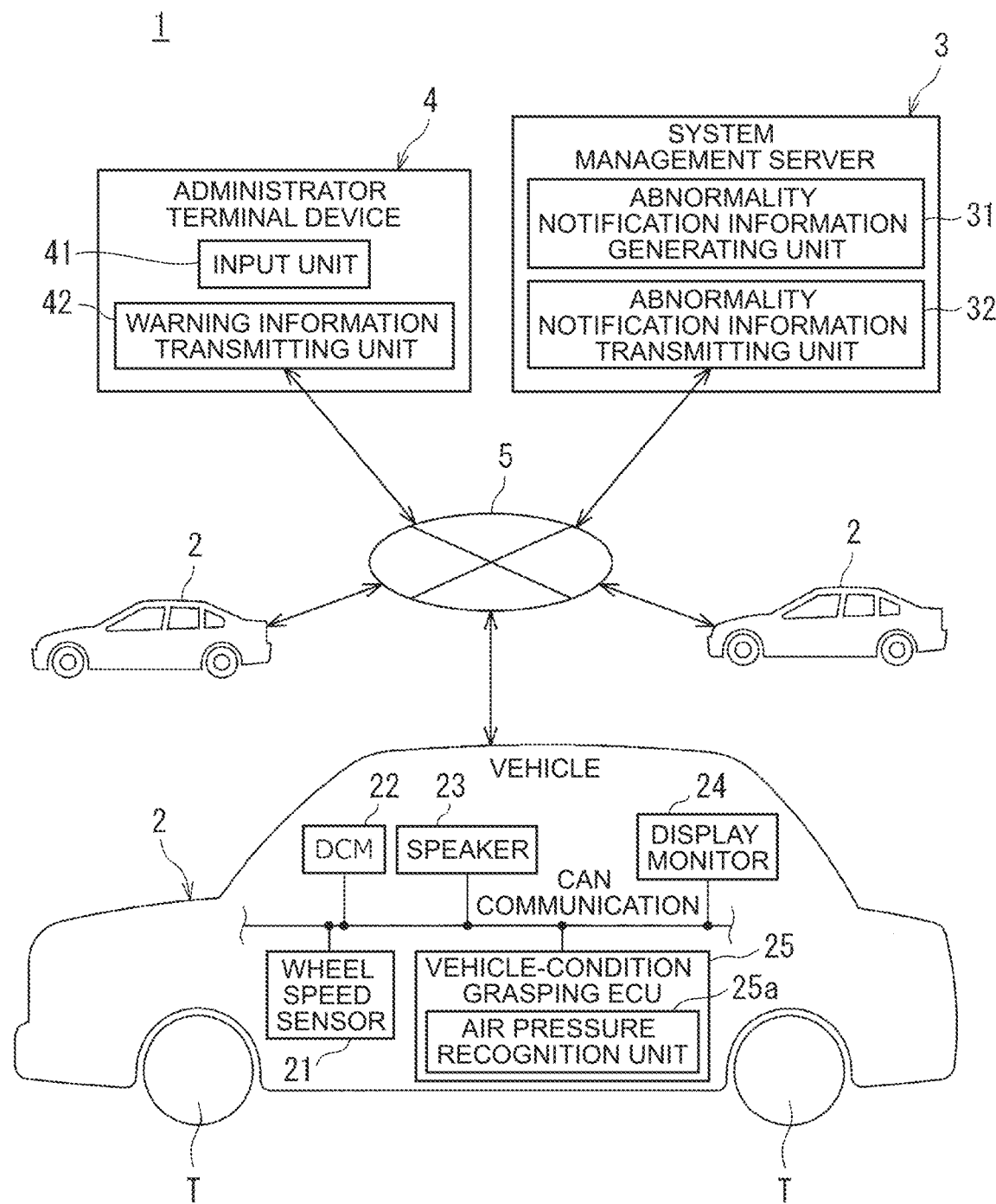
FIG. 1 is a diagram illustrating a schematic configuration of a vehicle state grasping system according to a first embodiment.

First, a first embodiment will be described.
Outline Configuration of Vehicle State Grasping System FIG. 1 is a diagram illustrating a schematic configuration of a vehicle state grasping system 1 according to the present embodiment. As illustrated in FIG. 1, the vehicle state grasping system 1 includes a plurality of vehicles (taxi vehicles) 2, 2, . . . , a system management server (for example, a cloud server) 3, and an administrator terminal device (a communication device operated by an administrator in the present disclosure) 4. The system management server 3 and the administrator terminal device 4 are installed in, for example, a taxi company. In addition, communication using a predetermined communication network 5 is possible between the vehicles 2, 2, . . . , the system management server 3, and the administrator terminal device 4.

The communication form between these vehicles 2 and 2 . . . and the system management server 3 and the administrator terminal device 4, The form (the form in which communication between the vehicles 2 and 2 . . . and the system management server 3 and the administrator terminal device 4 is performed using the same communication network; hereinafter referred to as a communication mode of a first pattern) which communicates bidirectionally through the mobile phone network which has a large number of base stations, the Internet network, and the exclusive communication network, etc., Below, the form in which the communication form between the vehicles 2 and 2 . . . and the system management server 3 performs bidirectional communication through the mobile phone network, the Internet network, and the exclusive communication network, etc., and the form in which the communication form between the vehicles 2 and 2 . . . and the administrator terminal device 4 performs bidirectional communication through the existing exclusive communication network (the wireless communication network for dispatch) (hereinafter referred to as a communication mode of a second pattern). Hereinafter, the communication mode of the first pattern will be described as an example.
Vehicle Vehicles 2, 2, . . . managed by the operation administrator (administrator) will be described. In each of the vehicles 2, 2, . . . shown in FIG. 1, the components related to the vehicle state grasping system 1 have the same configuration. FIG. 1 shows a configuration of a part related to the vehicle state grasping system 1, representing one vehicle 2.

The vehicle 2 is equipped with a wheel speed sensor 21, a Data Communication Module (DCM) 22, a speaker (user interface device) 23, a display monitor (user interface device) 24, and a vehicle condition grasping ECU 25. These devices are connected to each other so as to be able to communicate with each other through an in-vehicle network such as CAN.

The wheel speed sensor 21 detects the rotational speed (the number of revolutions per unit time) of each wheel (four wheels: hereinafter, sometimes referred to as a tire instead of a wheel) T, T, . . . of the vehicle 2. As the wheel speed sensor 21, a well-known magnetic sensor such as an electromagnetic pickup or a Hall sensor can be used.

DCM 22 is a communication device that performs two-way communication with the system management server 3 and the administrator terminal device 4 through the communication network 5.

The speaker 23 is installed in a vehicle cabin (for example, installed on an inner surface of a front door or the like), and outputs a sound for giving a warning, which will be described later, to a driver of the vehicle 2. The speaker 23 may be dedicated to the vehicle state grasping system 1, or may be also used as a speaker of a car audio (not shown) or a speaker of a car navigation system (not shown).

The display monitor 24 displays an image for giving a warning to the driver of the vehicle 2, which will be described later. The display monitor 24 is constituted by, for example, a touch panel type liquid crystal display, and may be dedicated to the vehicle state grasping system 1 or may also be used as a display monitor of a car navigation system (not shown).

ECU 25 includes, for example, a processor such as a Central Processing Unit (CPU, a Read Only Memory (ROM for storing a control program, a Random Access Memory (RAM for temporarily storing data, and an input/output port.

ECU 25 includes an air pressure recognition unit 25a as a functional unit realized by the control program. The air pressure recognition unit 25a has a function of individually recognizing the air pressure (internal pressure) of each of the tire (four tires) T, T, . . . of the vehicle 2. Hereinafter, the principle of recognizing the air pressure of the tire T will be described.

Figure 2:
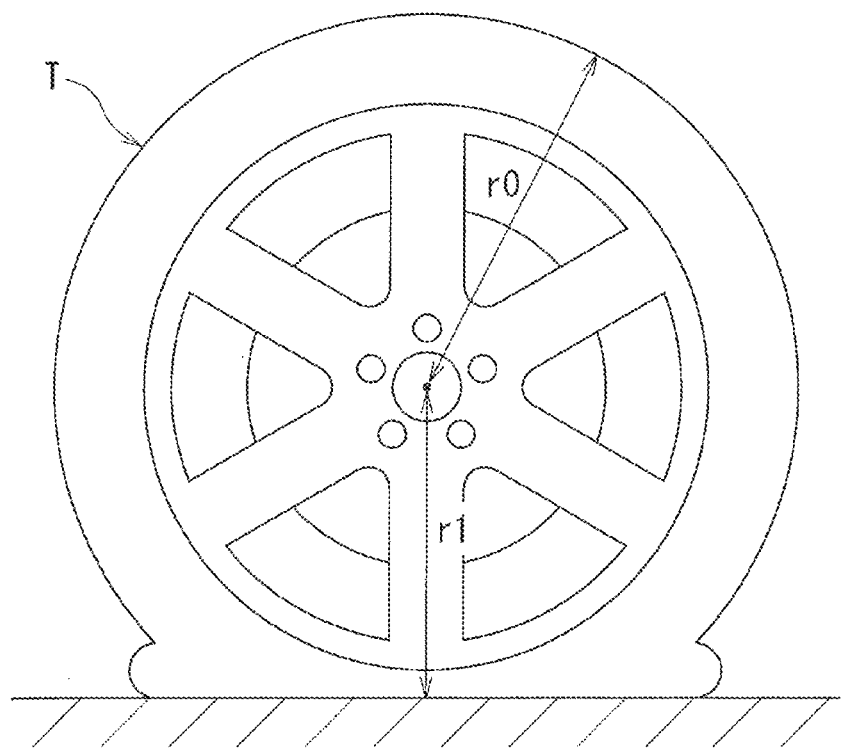
FIG. 2 is a side view of a tire for explaining the principle of tire puncture detection.

When the tire T is punctured by a nail or the like, and the puncture is such that the air gradually escapes, the vehicle 2 can travel even after the puncture has occurred. However, as the air gradually escapes, as shown in FIG. 2, the tire T is deformed in the road surface installation portion, and the amount of deformation gradually increases. At this time, the air pressure of the tire T gradually decreases. When the vehicle 2 travels under such circumstances, the tire radius (the radial r1 in FIG. 2) at the road surface installation portion of the tire T becomes shorter than the original tire radius (the tire radius other than the road surface installation portion and the radial r0 in FIG. 2). Therefore, the circumferential length of the tire T in which the puncture occurs becomes shorter than the circumferential length of the other tire (tire in which the puncture does not occur) T. In other words, the time required for one rotation of the tire T in which the puncture occurs becomes shorter than the time required for one rotation of the other tire T. That is, in the case where the vehicle 2 is traveling straight, the rotational speed (rotational angular speed) of the tire T in which the puncture occurs is higher than the rotational speed of the tire T in which the puncture does not occur. Since there is a certain degree of proportionality between the shortening of the tire radial r1 at the road surface installation part of the tire T and the reduction of the air pressure of the tire T, it is possible to individually recognize (estimate) the air pressure of each tire T, T, . . . by using the information of the difference in the rotational speed of each tire T, T, . . . .

For example, assuming that the air pressure of the tire T having the lowest rotational speed among the tire T, T, . . . is an appropriate value, the air pressure of each tire T, T, . . . is estimated from the difference in the rotational speed with respect to the tire T (the tire having the lowest rotational speed) (estimating that the air pressure is lower as the difference in the rotational speed of the tire T is larger). Further, not only when the rotational speeds of all the tire T, T, . . . are compared, but also the air pressure may be estimated by comparing the rotational speeds of the pair of tire T, T. For example, the rotational speeds of the front tires (front wheels) and the rear tires (rear wheels) may be compared, the rotational speeds of the right tires (right front wheels and right rear wheels) may be compared, the rotational speeds of the left tires (left front wheels and left rear wheels) may be compared, and the rotational speeds of the diagonal tires (right front wheels and left rear wheels, left front wheels and right rear wheels) may be compared.

The relationship between the difference in the rotational speed and the amount of decrease in the air pressure is defined in advance by an experiment or a simulation according to the type of the tire T, and the air pressure of the tire T can be estimated accordingly.

Since the wheel speed sensor 21 detects the rotational speed of each wheel (each tire T, T,), the output from the wheel speed sensor 21 (the rotational speed information of each tire T, T, . . . ) is transmitted to the air pressure recognition unit 25*a*, and the air pressure recognition unit 25*a* individually recognizes the air pressure of each tire T, T, . . . at a predetermined time-interval (for example, every few sec) using the above-described principles. In addition, the individual information (ID information) of the vehicle 2 and the individual information of the tire T are associated with the information of the air pressures of the respective tire T, T, . . . recognized by the air pressure recognition unit 25*a*.

The thus estimated (recognized) information on the air pressure of each tire T, T, . . . (the individual information of the vehicle 2 and the information on the air pressure associated with the individual information of the tire T) is transmitted to DCM 22 at a predetermined time interval, and DCM 22 transmits the information on the air pressure to the system management server 3 at a predetermined time interval through the communication network 5. Therefore, this DCM 22 corresponds to the air pressure information transmitting unit (the air pressure information transmitting unit that transmits the information of the air pressure of the tire recognized by the air pressure recognition unit).

System Management Server

The system management server 3 performs information processing in accordance with information on the air pressure of each tire T, T, . . . received from DCM 22 of each of the vehicles 2, 2, . . . , and includes an abnormality notification information generating unit 31 and an abnormality notification information transmitting unit 32 as functional units thereof. The functions of the respective units 31 and 32 are realized by a program stored in a computer provided in the system management server 3.

As described above, in a case where a plurality of drivers alternately ride the same taxi vehicle under the management of the taxi company (operation administrator), there is a possibility that there is a driver for continuously driving the vehicle 2 (avoiding troublesome tire replacement operation) by replenishing air without replacing the tire (adding air at a service station or the like) even if the tire T is punctured (punctured to the extent that the air gradually escapes). Hereinafter, the action of the driver will be referred to as an "inappropriate return air pressure action". In the case where the air pressure inappropriate return action is performed, a tire replacement operation or a puncture repair operation is forced to be performed on a driver who gets in, and the burden on the driver increases. In addition, the driver has a problem in that the driver is dissatisfied with the fact that the tire replacement operation and the puncture repair operation have to be performed even though the driver does not puncture the tire T.

In view of this point, the abnormality notification information generating unit 31 creates abnormality notification information when the tire replacement operation and the tire repair operation are not performed after the air pressure of the tire T has decreased to a predetermined abnormal value based on the information on the air pressure of each of the tire T, T, . . . received from DCM 22 (when the air pressure inappropriate return operation is performed). Hereinafter, a specific description will be given.

The abnormality notification information generating unit 31 determines that the tire (the tire having the high rotational speed described above) T is punctured when the air pressure of the tire T is lower than the proper value by more than 30% (which is less than 70% of the proper value: which corresponds to the abnormal value described in the present disclosure) based on the information on the air pressure of each of the respective tire T, T, . . . of the vehicles 2, 2, . . . received from DCM 22. Since the individual information of the vehicle 2 and the individual information of the tire T are associated with the information of the air pressures of the respective tire T, T, . . . , when it is determined that the tire T is punctured, it is possible to specify which tire T of any vehicle 2 is punctured. The threshold for the puncture determination described above is not limited to 30%, and can be arbitrarily set. The appropriate value of the air pressure is defined in advance according to the type of the tire T.

After it is determined that the tire T is punctured in this manner, when the air pressure of the tire T is restored to the normal value without any of the tire replacement operation and the tire repair operation performed by the driver (for example, when the air pressure becomes 80% or more of the proper value), it is determined that the air pressure inappropriate restoration action in which the vehicle 2 is continuously driven is performed by replenishing the air without performing the tire replacement operation or the tire repair operation (performing the air splicing at the service station or the like) (the driver is in a state in which the troublesome tire replacement operation is avoided) even though the tire T is punctured, and the abnormality notification information generating unit 31 transmits the abnormality notification information to the abnormality notification information transmitting unit 32. Since the individual information of the vehicle 2 and the individual information of the tire T are also associated with the abnormality notification information, it is possible to specify which tire T of any vehicle 2 has been subjected to an inappropriate return of air pressure.

Detection that the tire replacement operation has not been performed is performed by detecting whether or not the tire T has been removed. For example, the tire T is provided with a predetermined switch (a switch that is OFF when it is detached from the hub), and ON/OFF of the switch is detected to determine whether or not a tire replacement operation has been performed. That is, when the air pressure returns to the normal level while ON status of the switch is maintained, it is determined that the air pressure inappropriate return action has been performed. In addition, a switch for detecting that a spare tire stored in a trunk room or the like of a vehicle has been removed (a switch that is turned OFF when the spare tire is removed) is provided, and ON/OFF of the switch is detected to determine whether or not a tire replacement operation has been performed. Also in this case, when the air pressure returns to the normal level while ON status of the switch is maintained, it is determined that the air pressure inappropriate return action has been performed. The method of detecting that the tire replacement operation has not been performed is not limited to the method described above, and IC tips may be attached to the respective tire T, T, . . . to use the identification information of IC tips.

Further, the detection that the tire repair operation has not been performed includes providing a switch for detecting that the container of the tire repair agent stored in the luggage compartment of the vehicle has been removed (a switch that is OFF when the container of the tire repair agent is taken out from the luggage compartment or the like), and detecting ON/OFF of the switch to determine whether or not the tire repair operation has been performed. That is, when the air pressure returns to the normal level while ON status of the switch is maintained, it is determined that the air pressure inappropriate return action has been performed. The method of detecting that the tire repair operation has not been performed is not limited to the method described above.

When the abnormality notification information is received from the abnormality notification information generating unit 31, the abnormality notification information transmitting unit 32 transmits the abnormality notification information to the administrator terminal device 4 through the communication network 5.

Administrator Terminal Device

The administrator terminal device 4 is, for example, a personal computer installed in the management section of the taxi company, and can perform various instructions, warnings, and the like for the drivers of the vehicles 2, 2. by being operated by the operation administrator.

In addition, when receiving the abnormality notification information from the abnormality notification information transmitting unit 32 of the system management server 3, the administrator terminal device 4 in the present embodiment displays the abnormality notification information on the display screen, and provides the vehicle 2 in which the air pressure inappropriate return action has been performed, the individual information of the vehicle 2 (vehicle body number and the like), and the individual information of the tire T in which the puncture has occurred (information on which of the four tires is the tire T) to the operation administrator. In addition, in a case where the driving information of each driver (information on which time zone the driver is riding in which vehicle 2) is stored in the system management server 3, the personal information of the driver riding in the vehicle 2 in which the puncture has occurred is also provided to the operation administrator.

When such information is provided, the operation administrator issues a warning to the driver who has performed the inappropriate return of the air pressure through the communication network 5. That is, the driver (the current driver of the vehicle 2) is warned that a tire replacement operation or a tire repair operation needs to be performed.

Specifically, the administrator terminal device 4 includes an input unit 41 and a warning information transmitting unit 42 as functional units thereof.

The input unit 41 includes a keyboard, a pointing device, and the like for inputting an operation from an operation administrator. By the operation of the input unit 41, the operation administrator specifies the vehicle 2 that is the target of the warning, and performs the operation of transmitting the warning information.

The warning information transmitting unit 42 transmits the warning information from the administrator terminal device 4 to the communication network 5 in response to the operation of the input unit 41. As a form of the warning, one or both of a warning by sound from the speaker 23 mounted on the vehicle 2 and a warning by an image on the display monitor 24 are performed by transmitting warning information through the communication network 5 to the vehicle (the vehicle on which the driver who has performed the air pressure inappropriate restoration action is riding) 2. As an example of the warning, the left front tire is punctured. Replace the tire or repair the tire immediately. Provision of a sound (sound from the speaker 23) such as "or an image (an image on the display monitor 24) is exemplified.

In a case where the driver who has received the warning in this way performs the tire replacement operation or the tire repair operation, it is not necessary to force the driver to perform the tire replacement operation or the tire repair operation thereafter, and it is possible to eliminate the burden on the driver (the driver who rides after the tire replacement operation or the tire repair operation is performed).

Operation when Puncture Occurs

Figure 3:
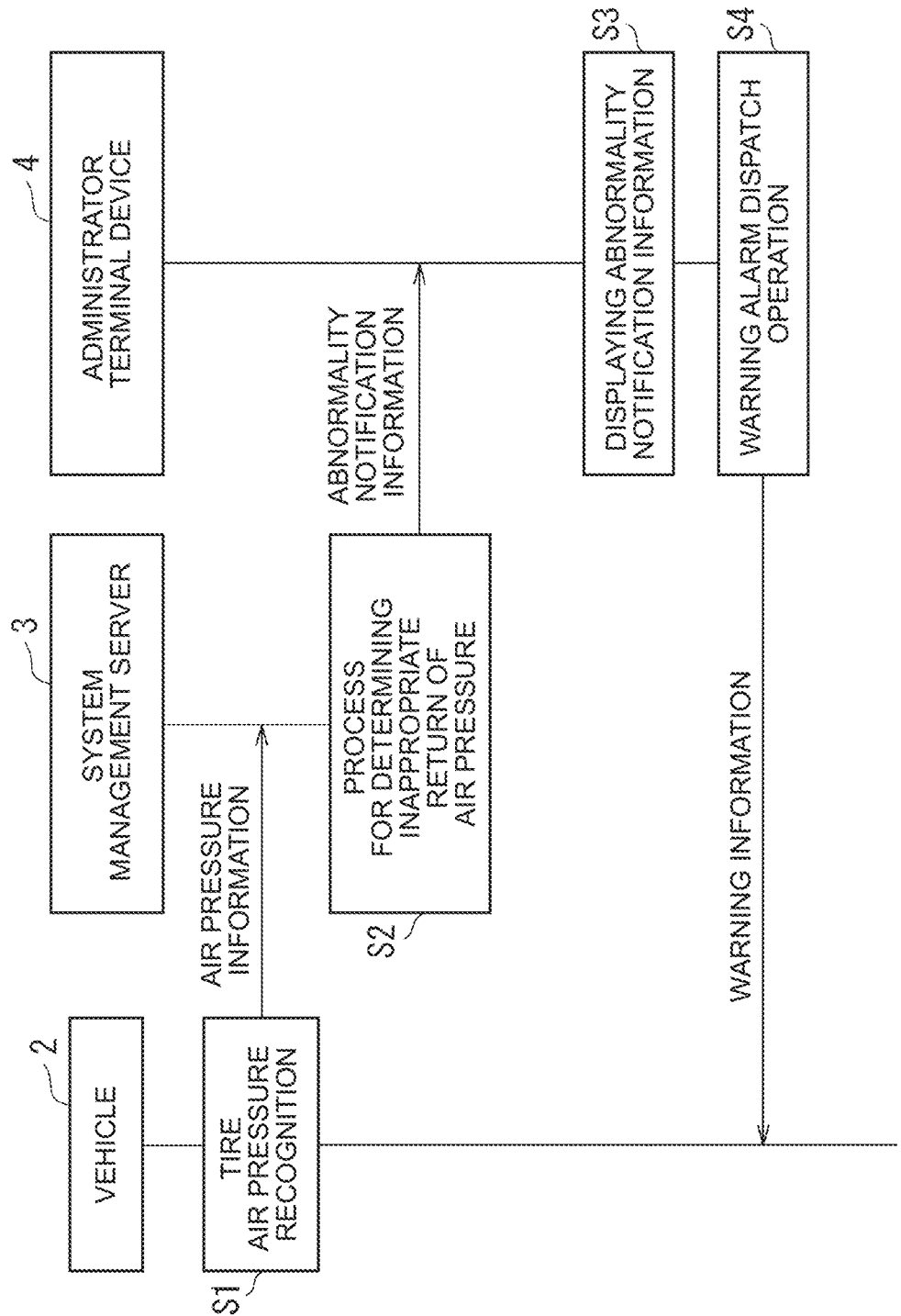
FIG. 3 is a sequence diagram illustrating an example of operations of the vehicle, the system management server, and the administrator terminal device in the first embodiment.

Next, an operation when a puncture occurs in the present embodiment will be described. FIG. 3 is a sequence diagram illustrating an example of operations of the vehicle 2, the system management server 3, and the administrator terminal device 4. In FIG. 3, the information processing operation (the recognition operation of the air pressure of the tire T) in the vehicle 2, the information processing operation (the creation operation and the transmission operation of the abnormality notification information) in the system management server 3, and the operation (the warning operation by the operation administrator) in the administrator terminal device 4 are shown in order from the left side. In FIG. 3, communication between one vehicle 2, the system management server 3, and the administrator terminal device 4 is taken as an example, but communication between another vehicle 2, the system management server 3, and the administrator terminal device 4 is also performed in the same manner.

First, the air pressure of each tire T, T, . . . is recognized by the air pressure recognition unit 25a mounted on the vehicle 2 (S1: air pressure recognition operation referred to in the present disclosure), and the information of the air pressure of each of the recognized tire T, T, . . . is transmitted from DCM 22 to the system management server 3.

On the basis of the received information on the air pressure of the tire T, T, . . . , the system management server 3 performs a determination process of determining whether or not the tire replacement operation and the tire repair operation have been restored to the normal value without performing any of the tire replacement operation and the tire repair operation after the air pressure of the tire T has decreased to the predetermined abnormal value (a determination process of whether or not the air pressure inappropriate return operation has occurred) (S2).

When it is determined that the air pressure inappropriate return action has been performed by returning to the normal value without performing any of the tire replacement operation and the tire repair operation, the abnormality notification information generating unit 31 creates abnormality notification information (an operation of creating abnormality notification information in the present disclosure), and the abnormality notification information is transmitted from the system management server 3 to the administrator terminal device 4.

In the administrator terminal device 4, information indicating that the vehicle 2 in which the air pressure inappropriate return action has been performed is present, individual information of the vehicle 2, and individual information of the tire T in which the puncture has occurred are displayed on a display screen (display of the abnormality notification information), and the abnormality notification information is provided to the operation administrator (S3).

In such a situation, the operation administrator performs an operation (warning information sending operation) of the administrator terminal device 4 to send warning information through the communication network 5 to the corresponding vehicle (the vehicle on which the driver who has performed the air pressure inappropriate return action rides) 2 (an operation of providing warning information in the present disclosure). As a result, one or both of a warning by sound from the speaker 23 mounted on the vehicle 2 and a warning by an image on the display monitor 24 are performed.

When the driver who has received the warning in this way performs the tire replacement operation or the tire repairing operation, there is no need to force the driver who gets in to perform the tire replacing operation or the tire repairing operation afterwards.

Advantageous Effect of Embodiment

As described above, in the present embodiment, in the case where the tire replacement operation and the tire repair operation are both restored to the normal value without being performed after the air pressure of the tire T has decreased to the predetermined abnormal value, the abnormality notification information is displayed on the administrator terminal device 4, and the operation administrator transmits warning information to the driver in accordance with the abnormality notification information. That is, the current driver of the vehicle is warned that a tire replacement operation or a tire repair operation needs to be performed. When the driver that has received the warning information performs the tire replacement operation or the tire repair operation, the driver that is to be ridden thereafter is not forced to perform the tire replacement operation or the tire repair operation, and the burden on the driver can be eliminated.

Further, in the present embodiment, the individual information of the vehicle 2 and the individual information of the tire T are associated with the information of the air pressure of each tire T, T, . . . recognized by the air pressure recognition unit 25a. Therefore, it is possible to specify which vehicle 2 has performed the air pressure inappropriate return action, and it is possible to accurately specify the vehicle 2 or the driver that is the transmission target of the warning information, and it is possible to appropriately transmit the warning information only to the vehicle 2 or the driver.

Second Embodiment

Next, the second embodiment will be described. The present embodiment is different from the first embodiment in the process of issuing warning information to the driver. Since the other configurations and processing operations are the same as those of the first embodiment, the processing of transmitting the warning information to the driver will be mainly described here.

Figure 4:
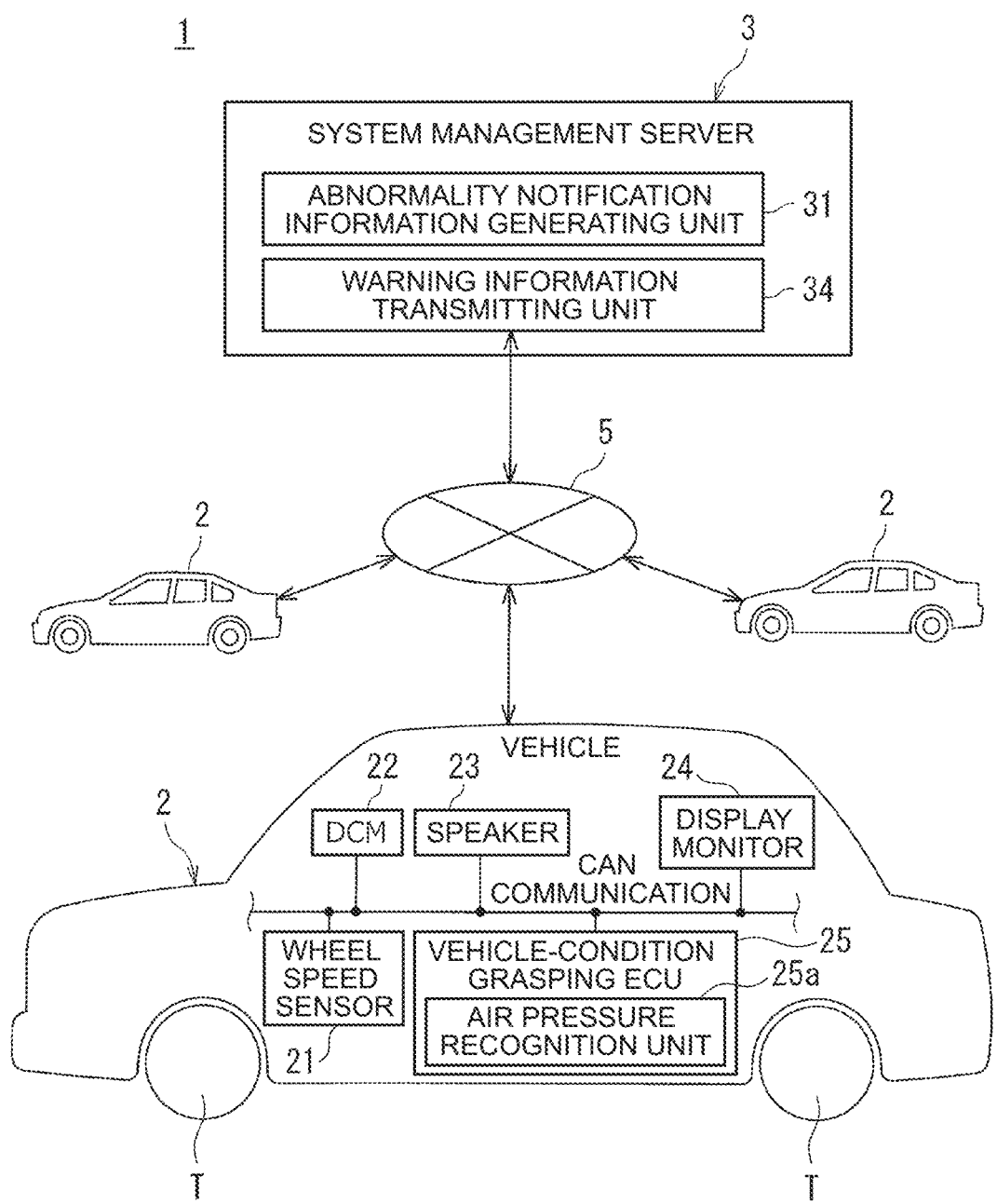
FIG. 4 is a diagram illustrating a schematic configuration of a vehicle state grasping system according to a second embodiment.

FIG. 4 is a diagram illustrating a schematic configuration of the vehicle state grasping system 1 according to the present embodiment. As shown in FIG. 4, the vehicle state grasping system 1 according to the present embodiment includes a plurality of vehicles 2, 2, . . . , and a system management server 3. In addition, communication using a predetermined communication network 5 is possible between the vehicles 2, 2, . . . , and the system management server 3.

Vehicle

The configuration of the parts related to the vehicle state grasping system 1 in each of the vehicles 2, 2, . . . is the same as that of the first embodiment. In other words, the estimated (recognized) information of the air pressure of tires T, T, . . . of the respective vehicles 2, 2, . . . is transmitted from DCM 22 to the system management server 3 through the communication network 5 at predetermined intervals.

System Management Server

The system management server 3 includes an abnormality notification information generating unit 31 and a warning information transmitting unit 34 as functional units thereof.

Similar to that of the first embodiment, the abnormality notification information generating unit 31 can specify which of the vehicles 2 the tire T is puncturing when it is determined that the tire T is puncturing based on the information on the air pressure of each of the vehicles 2, 2, . . . , the tire T, T, . . . received from DCM 22.

When it is determined that the tire T is punctured and the air pressure returns to a normal value without performing any of the tire replacement operation and the tire repair operation by the driver on the tire T, the abnormality notification information generating unit 31 in the present embodiment determines that the air pressure inappropriate return action has been performed, and transmits the abnormality notification information to the warning information transmitting unit 34.

When receiving the abnormality notification information from the abnormality notification information generating unit 31, the warning information transmitting unit 34 gives a warning to the driver who has performed the air pressure inappropriate return action that the tire replacement operation or the tire repair operation needs to be performed through the communication network 5. That is, by using the individual information of the vehicle 2 associated with the information on the air pressure of the tire T, it is determined which vehicle 2 has performed the air pressure inappropriate return action, and by transmitting the warning information to the vehicle 2, one or both of the warning by the sound from the speaker 23 mounted on the vehicle 2 and the warning by the image on the display monitor 24 are performed.

Also in the case of the present embodiment, when the driver who has received the warning performs the tire replacement operation or the tire repair operation, it is not necessary to force the driver to perform the tire replacement operation or the tire repair operation thereafter, and it is possible to eliminate the burden on the driver (the driver who rides after the tire replacement operation or the tire repair operation is performed).

Operation when Puncture Occurs

Figure 5:
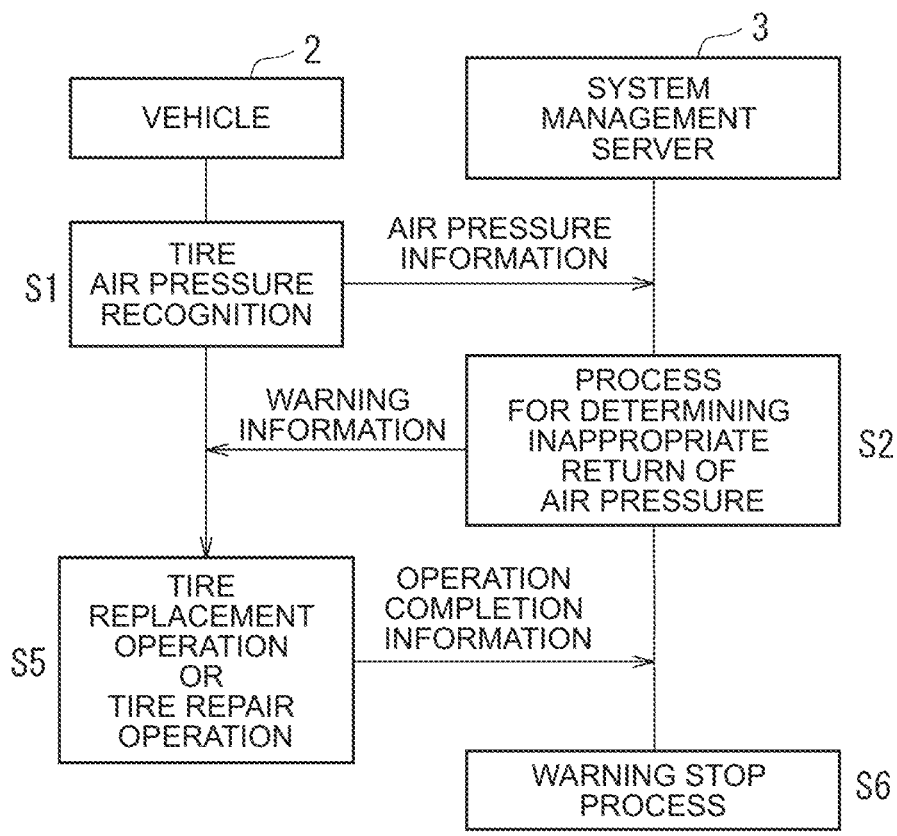
FIG. 5 is a sequence diagram illustrating an example of operations of the vehicle and the system management server according to the second embodiment.

Next, an operation when a puncture occurs in the present embodiment will be described. FIG. 5 is a sequence diagram illustrating an example of operations of the vehicle 2 and the system management server 3. In FIG. 5, the information processing operation in the vehicle 2 (the recognition operation of the air pressure of the tire T) and the information processing operation in the system management server 3 (the generation operation of the abnormality notification information and the transmission operation of the warning information) are shown in order from the left side. Although FIG. 5 also illustrates communication between one vehicle 2 and the system management server 3 as an example, communication between another vehicle 2 and the system management server 3 is performed in the same manner.

First, the air pressure of each tire T, T, . . . is recognized by the air pressure recognition unit 25a mounted on the vehicle 2 (S1), and the air pressure of each of the recognized tire T, T, . . . is transmitted from DCM 22 to the system management server 3.

On the basis of the received information on the air pressure of the tire T, T, . . . , the system management server 3 performs a determination process of determining whether or not the tire replacement operation and the tire repair operation have been restored to the normal value without performing any of the tire replacement operation and the tire repair operation after the air pressure of the tire T has decreased to the predetermined abnormal value (a determination process of whether or not the air pressure inappropriate return operation has occurred) (S2).

When it is determined that the air pressure inappropriate return action has been performed by returning to the normal value without performing any of the tire replacement operation and the tire repair operation, warning information is transmitted from the system management server 3 to the vehicle 2. As a result, one or both of a warning by sound from the speaker 23 mounted on the vehicle 2 and a warning by an image on the display monitor 24 are performed.

When the driver that has received the warning in this way performs the tire replacement operation or the tire repair operation (S5), the operation completion information is transmitted to the system management server 3. This operation completion information is transmitted in accordance with the detection of ON/OFF of the switch provided in the tire T described above. Alternatively, the operation completion information is transmitted to the system management server 3 by the operation of the terminal carried by the driver. In the system management server 3 that has received the operation completion information, a process (warning stopping process) of stopping the warning information transmitted toward the vehicle 2 is performed (S6), whereby the warning by the sound from the speaker 23 mounted on the vehicle 2 and the warning by the images on the display monitor 24 are stopped.

Advantageous Effect of Embodiment

Even in the present embodiment, the same effects as those of the first embodiment (in the case where the driver who has received the warning information performs the tire replacement operation or the tire repair operation, the driver who gets in after that is not forced to perform the tire replacement operation or the tire repair operation, and thus the burden on the driver can be eliminated) can be achieved. Further, in the present embodiment, since the warning information can be transmitted to the vehicle 2 without passing through the administrator terminal device 4, the burden on the operation administrator can be reduced.

(Warning Level Change Process in the Second Embodiment)
In the second embodiment, the warning level change processing described below may be performed in addition to the processing operation described above. Hereinafter, the warning level change processing will be described.

In a state where the warning information is transmitted to the vehicle 2 from the warning information transmitting unit 34 of the system management server 3, and one or both of the warning by the sound from the speaker 23 and the warning by the image on the display monitor 24 are performed, when the air pressure inappropriate return action is performed again in the same vehicle 2, the warning level of the warning information to be transmitted to the vehicle 2 is increased from the warning information transmitting unit 34 of the system management server 3. For example, the sound of the warning from the speaker 23 is made larger (larger than the sound of the warning from the speaker 23 performed on the previous air pressure inappropriate return action). Further, the size of the image of the warning on the display monitor 24 is increased (larger than the size of the image of the warning on the display monitor 24 performed for the previous air pressure inappropriate return action). Specifically, in a situation where the schedule management of the boarding time period of each driver in each vehicle 2 is performed, the warning level of the warning information transmitted toward the vehicle 2 is increased when a certain driver performs the air pressure inappropriate return again in the boarding time period.

This raises the warning level of the warning information in order to prohibit an inappropriate return of air pressure by the same driver. As a result, it is possible to increase the deterrent force against repeated inappropriate return of the air pressure.

Third Embodiment

A third embodiment will be described below. The present embodiment is different from the first embodiment and the second embodiment in the process of transmitting the warning information to the driver. Since other configurations and processing operations are the same as those of the first embodiment and the second embodiment, the process of issuing warning information to the driver will be mainly described here.

Figure 6:
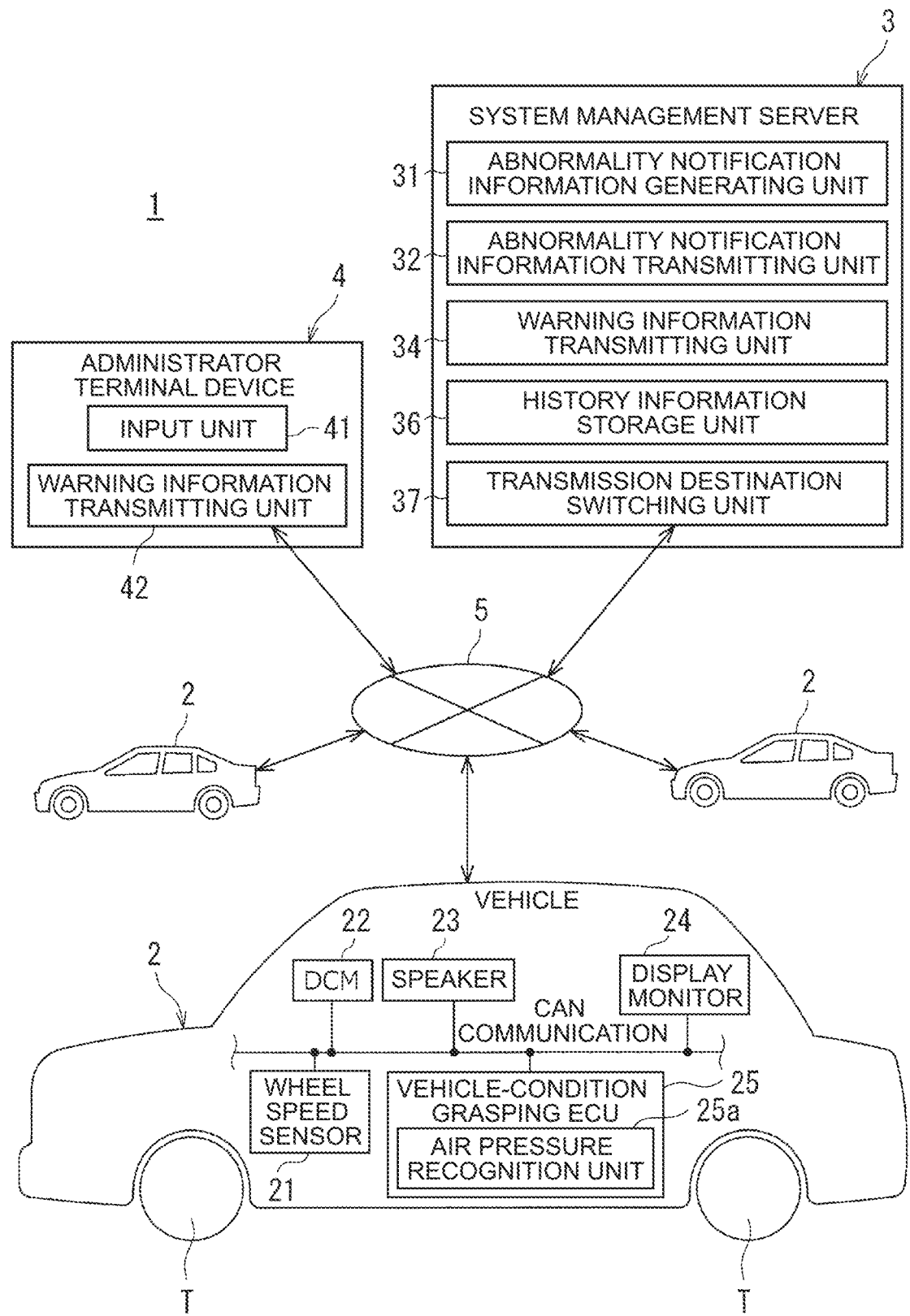
FIG. 6 is a diagram illustrating a schematic configuration of a vehicle state grasping system according to a third embodiment.

FIG. 6 is a diagram illustrating a schematic configuration of the vehicle state grasping system 1 according to the present embodiment. As illustrated in FIG. 6, the vehicle state grasping system 1 according to the present embodiment includes a plurality of vehicles 2, 2, . . . , a system management server 3, and an administrator terminal device 4. In addition, communication using a predetermined communication network 5 is possible between the vehicles 2, 2, . . . , the system management server 3, and the administrator terminal device 4.

Vehicle

The configuration of the parts related to the vehicle state grasping system 1 in each of the vehicles 2, 2, . . . is the same as that of the first embodiment. In other words, the estimated (recognized) information of the air pressure of tires T, T, . . . of the respective vehicles 2, 2, . . . is transmitted from DCM 22 to the system management server 3 through the communication network 5 at predetermined intervals.

System Management Server

The system management server 3 includes an abnormality notification information generating unit 31, an abnormality notification information transmitting unit 32, a warning information transmitting unit 34, a history information storage unit 36, and a transmission destination switching unit 37 as functional units.

Similar to that of the first embodiment, the abnormality notification information generating unit 31 can specify which of the vehicles 2 the tire T is puncturing when it is determined that the tire T is puncturing based on the information on the air pressure of each of the vehicles 2, 2, . . . , the tire T, T, . . . received from DCM 22.

Then, when it is determined that the tire T is punctured and the air pressure of the tire T returns to the normal value without performing any of the tire replacement operation and the tire repair operation by the driver, the abnormality notification information generating unit 31 in the present embodiment determines that the air pressure inappropriate return action has been performed, and transmits the abnormality notification information to the transmission destination switching unit 37.

On condition that the abnormality notification information transmitted by the abnormality notification information generating unit 31 is received (more specifically, when the abnormality notification information transmitted by the abnormality notification information generating unit 31 is received via the transmission destination switching unit 37), the abnormality notification information transmitting unit 32 transmits the abnormality notification information to the administrator terminal device 4 through the communication network 5.

On condition that the abnormality notification information transmitted by the abnormality notification information generating unit 31 is received (more specifically, when the abnormality notification information transmitted by the abnormality notification information generating unit 31 is received via the transmission destination switching unit 37), the warning information transmitting unit 34 transmits the warning information to the vehicle 2 on which the driver who has performed the air pressure inappropriate return action rides.

The history information storage unit 36 stores the driving history information of each driver registered in advance in the vehicle state grasping system 1. Specifically, when there is a driver having a history of performing an inappropriate return of air pressure, information of the driver (personal information of the driver) is accumulated.

The transmission destination switching unit 37 can switch between a first transmission mode in which the abnormality notification information received from the abnormality notification information generating unit 31 is transmitted toward the abnormality notification information transmitting unit 32 and a second transmission mode in which the abnormality notification information received from the abnormality notification information generating unit 31 is transmitted toward the warning information transmitting unit 34.

Specifically, in a case where the air pressure inappropriate return action is performed, the driving history information of each driver stored in the history information storage unit 36 is referred to, and in a case where the current driver of the vehicle 2 (the driver who has performed the air pressure inappropriate return action) is a driver having a history of performing the air pressure inappropriate return action in the past, the first transmission mode is set. That is, the abnormality notification information received from the abnormality notification information generating unit 31 is transmitted to the abnormality notification information transmitting unit 32. On the other hand, in a case where the current driver of the vehicle 2 (a driver that has performed an inappropriate return of air pressure) is a driver that does not have a history of performing an inappropriate return of air pressure in the past, the driver is set to a second transmission form. That is, the abnormality notification information received from the abnormality notification information generating unit 31 is transmitted to the warning information transmitting unit 34.

A driver having a history of performing an inappropriate return of air pressure in the past is likely to perform the same action again. In view of this point, in the present embodiment, in a case where an inappropriate return of air pressure is performed, in a case where the driver of the vehicle 2 has performed an inappropriate return of air pressure also in the past, the warning information is transmitted from the operation administrator instead of the system management server 3 automatically transmitting the warning information toward the vehicle 2. Thus, an artificial warning (advice) can be given to the current driver of the vehicle 2 by the operation administrator. Therefore, it is possible to increase the forcing force of causing the driver to perform the tire replacement operation or the tire repair operation.

Operation when Puncture Occurs

Next, an operation when a puncture occurs in the present embodiment will be described. FIG. 7 is a sequence diagram illustrating an example of operations of the vehicle 2, the system management server 3, and the administrator terminal device 4. In FIG. 7, the information processing operation (the recognition operation of the air pressure of the tire T) in the vehicle 2, the information processing operation (the creation operation and the transmission operation of the abnormality notification information) in the system management server 3, and the operation (the warning operation by the operation administrator) in the administrator terminal device 4 are shown in order from the left side. Although FIG. 7 also illustrates communication between one vehicle 2 and the system management server 3 and the administrator terminal device 4 as an example, communication between another vehicle 2, the system management server 3, and the administrator terminal device 4 is performed in the same manner.

First, the air pressure of each tire T, T, . . . is recognized by the air pressure recognition unit 25a mounted on the vehicle 2 (S1), and the air pressure of each of the recognized tire T, T, . . . is transmitted from DCM 22 to the system management server 3.

On the basis of the received information on the air pressure of the tire T, T, . . . , the system management server 3 performs a determination process of determining whether or not the tire replacement operation and the tire repair operation have been restored to the normal value without performing any of the tire replacement operation and the tire repair operation after the air pressure of the tire T has decreased to the predetermined abnormal value (a determination process of whether or not the air pressure inappropriate return operation has occurred) (S2).

When it is determined that the air pressure inappropriate return action has been performed by returning to the normal value without performing any of the tire replacement operation and the tire repair operation, the system management server 3 refers to the driving history information of the driver who has performed the air pressure inappropriate return action, and performs a determination process (history determination process) of determining whether or not the driver has a history of performing the air pressure inappropriate return action in the past (S7).

Then, in a case where the driver does not have a history of performing an inappropriate return of air pressure in the past, the abnormality notification information received from the abnormality notification information generating unit 31 is transmitted toward the warning information transmitting unit 34, whereby warning information is transmitted from the system management server 3 toward the vehicle 2 (see an arrow indicated by a broken line in FIG. 7). As a result, one or both of a warning by sound from the speaker 23 mounted on the vehicle 2 and a warning by an image on the display monitor 24 are performed.

When the driver that has received the warning in this way performs the tire replacement operation or the tire repair operation (S5), the operation completion information is transmitted to the system management server 3. This operation completion information is transmitted in accordance with the detection of ON/OFF of the switch provided in the tire T described above. In the system management server 3 that has received the operation completion information, a process (warning stopping process) of stopping the warning information transmitted toward the vehicle 2 is performed (S6), whereby the warning by the sound from the speaker 23 mounted on the vehicle 2 and the warning by the images on the display monitor 24 are stopped.

On the other hand, when the driver has a history of performing an inappropriate return of air pressure in the past, the abnormality notification information received from the abnormality notification information generating unit 31 is transmitted to the administrator terminal device 4.

In the administrator terminal device 4, information indicating that the vehicle 2 in which the air pressure inappropriate return action has been performed is present, information indicating that the driver of the vehicle 2 is a driver having a history of the air pressure inappropriate return action in the past, individual information of the vehicle 2, and individual information of the tire T in which the puncture has occurred are displayed on a display screen (display of the abnormality notification information), and the abnormality notification information is provided to the operation administrator (S3).

Then, the operation administrator performs an operation (warning information sending operation) of the administrator terminal device 4 to send warning information through the communication network 5 to the corresponding vehicle (the vehicle on which the driver who has performed the air pressure inappropriate return action rides) 2. As a result, one or both of a warning by sound from the speaker 23 mounted on the vehicle 2 and a warning by an image on the display monitor 24 are performed.

As a result, an artificial warning (advice) is given to the current driver of the vehicle 2 by the operation administrator, and the force of causing the driver to perform the tire replacement operation or the tire repair operation can be increased. As a means for further enhancing the forcing force, it is preferable to emit the sound of the operation administrator from the speaker 23 (or to enhance the forcing force by direct conversation between the operation administrator and the driver), as an image on the display monitor 24, the operation administrator to display the character information input by the operation of the input unit 41 (to display the character information which is a strong warning from the administrator).

Advantageous Effect of Embodiment

Even in the present embodiment, the same effects as those of the first embodiment (in the case where the driver who has received the warning information performs the tire replacement operation or the tire repair operation, the driver who gets in after that is not forced to perform the tire replacement operation or the tire repair operation, and thus the burden on the driver can be eliminated) can be achieved. Further, in the present embodiment, it is possible to increase the forcing force against the repeated air pressure inappropriate return action.

Other Embodiments

It should be noted that the present disclosure is not limited to the above-described embodiments, and all modifications and applications encompassed within the scope of the claims and the scope of equivalents thereof are possible.

For example, in each of the above-described embodiments, the vehicle state grasping system 1 according to the present disclosure is applied to a vehicle management system in a taxi company as an example. The present disclosure is not limited thereto, and is applicable to a vehicle management system in a rental car company or a vehicle management system in another car sharing operating company.

Further, in the above embodiments, the air pressure recognition unit 25a individually recognizes the air pressure of each tire T, T, . . . by using the difference in the rotational speed of each tire T, T, . . . . The present disclosure is not limited to this, and a pressure sensor may be provided for each tire T, T, . . . to individually recognize the air pressure of each tire T, T, . . . .

Further, in each of the above-described embodiments, the warning information is transmitted to the vehicle (the vehicle on which the driver who has performed the air pressure inappropriate return action rides) 2 through the communication network 5, so that one or both of the warning by the sound from the speaker 23 mounted on the vehicle 2 and the warning by the image on the display monitor 24 are performed. The present disclosure is not limited to this, and the warning information may be transmitted to a terminal (such as a smartphone) carried by the driver, and one or both of a warning by voice from the terminal and a warning by an image on a display screen of the terminal may be performed.

In the above embodiments, the individual information of the vehicle 2 and the individual information of the tire T are associated with the information of the air pressure of each tire T, T, . . . recognized by the air pressure recognition unit 25a. The present disclosure is not limited to this, and only the individual information of the vehicle 2 may be associated with the information of the air pressure.

The present disclosure is applicable to a vehicle state grasping system capable of grasping a state of a vehicle in a vehicle usage form in which a plurality of drivers shares a vehicle under the control of an administrator.

What is claimed is:

1. A vehicle state grasping system that is able to grasp a state of a vehicle in a vehicle usage mode in which a plurality of drivers shares the vehicle under an administrator, the vehicle state grasping system comprising:
   an air pressure recognition unit that recognizes an air pressure of a tire of the vehicle;
   an air pressure information transmitting unit that transmits information on the air pressure of the tire recognized by the air pressure recognition unit; and
   a system management server that receives the information on the air pressure of the tire transmitted by the air pressure information transmitting unit, wherein:
   the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire;
   the system management server includes an abnormality notification information transmitting unit that transmits the abnormality notification information to a communication device operated by the administrator when the abnormality notification information is received from the abnormality notification information generating unit; and
   the communication device is configured to be able to provide warning information to at least one of a user interface device mounted on the vehicle and a terminal carried by a current driver of the vehicle by an operation of the administrator.

2. A vehicle state grasping system that is able to grasp a state of a vehicle in a vehicle usage mode in which a plurality of drivers shares the vehicle under an administrator, the vehicle state grasping system comprising:
   an air pressure recognition unit that recognizes an air pressure of a tire of the vehicle;

an air pressure information transmitting unit that transmits information on the air pressure of the tire recognized by the air pressure recognition unit; and
a system management server that receives the information on the air pressure of the tire transmitted by the air pressure information transmitting unit, wherein:
the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire; and
the system management server includes a warning information transmitting unit that transmits warning information to at least one of a user interface device mounted on the vehicle and a terminal carried by a current driver of the vehicle when the abnormality notification information is received from the abnormality notification information generating unit.

3. The vehicle state grasping system according to claim 2, wherein the system management server raises a warning level of the warning information transmitted from the warning information transmitting unit when the normal value of the air pressure of the tire is recovered without performing any of the tire replacement operation and the tire repair operation after the air pressure of the tire of the same vehicle drops to the predetermined abnormal value again after the warning information is transmitted to at least one of the user interface device mounted on the vehicle and the terminal carried by the current driver of the vehicle from the warning information transmitting unit.

4. A vehicle state grasping system that is able to grasp a state of a vehicle in a vehicle usage mode in which a plurality of drivers shares the vehicle under an administrator, the vehicle state grasping system comprising:
an air pressure recognition unit that recognizes an air pressure of a tire of the vehicle;
an air pressure information transmitting unit that transmits information on the air pressure of the tire recognized by the air pressure recognition unit; and
a system management server that receives the information on the air pressure of the tire transmitted by the air pressure information transmitting unit, wherein:
the system management server includes an abnormality notification information generating unit that generates abnormality notification information when a normal value of the air pressure of the tire is recovered without performing any of a tire replacement operation and a tire repair operation after the air pressure of the tire drops to a predetermined abnormal value, based on the received information on the air pressure of the tire;
the system management server includes an abnormality notification information transmitting unit that transmits the abnormality notification information to a communication device operated by the administrator on condition that the abnormality notification information is received;
the system management server includes a warning information transmitting unit that transmits warning information to at least one of a user interface device mounted on the vehicle and a terminal carried by a current driver of the vehicle on condition that the abnormality notification information is received;
the system management server includes a transmission destination switching unit that is able to switch between a first transmission mode to transmit the abnormality notification information to the abnormality notification information transmitting unit and a second transmission mode to transmit the abnormality notification information to the warning information transmitting unit;
the system management server includes a history information storage unit that stores driving history information of each of the drivers; and
when the air pressure of the tire recovers the normal value without performing any of the tire replacement operation and the tire repair operation after the air pressure of the tire drops to the predetermined abnormal value, the transmission destination switching unit switches to the first transmission mode when the driver is a driver with a past history of recovering the normal value of the air pressure of the tire without performing any of the tire replacement operation and the tire repair operation after the air pressure of the tire drops to the predetermined abnormal value, and switches to the second transmission mode when the driver is any other driver than the driver with the history, with reference to the driving history information of each of the drivers stored in the history information storage unit.

\* \* \* \* \*